US011651574B2

(12) United States Patent
Suto et al.

(10) Patent No.: US 11,651,574 B2
(45) Date of Patent: *May 16, 2023

(54) IMAGE PROCESSING DEVICE, IMAGE PROCESSING METHOD, AND PROGRAM

(71) Applicant: SONY CORPORATION, Tokyo (JP)

(72) Inventors: Yasuhiro Suto, Tokyo (JP); Masaki Fukuchi, Tokyo (JP); Kenichirou Ooi, Kanagawa (JP); Jingjing Guo, Tokyo (JP); Kouichi Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,605

(22) Filed: Nov. 18, 2021

(65) Prior Publication Data
US 2022/0076499 A1 Mar. 10, 2022

Related U.S. Application Data

(63) Continuation of application No. 17/069,389, filed on Oct. 13, 2020, now Pat. No. 11,189,105, which is a
(Continued)

(30) Foreign Application Priority Data

Feb. 2, 2010 (JP) ................................. 2010-021368

(51) Int. Cl.
G06T 19/00 (2011.01)
G09G 5/00 (2006.01)
(Continued)

(52) U.S. Cl.
CPC ........ G06T 19/006 (2013.01); G02B 27/0172 (2013.01); G06T 11/60 (2013.01);
(Continued)

(58) Field of Classification Search
CPC ......... G09G 5/00; G06T 19/006; G06T 11/60; G06T 19/003; G02B 27/0172; G02B 2027/014
See application file for complete search history.

(56) References Cited

U.S. PATENT DOCUMENTS

2003/0218638 A1 11/2003 Goose et al.
2004/0046779 A1 3/2004 Asano et al.
(Continued)

FOREIGN PATENT DOCUMENTS

AU 2002368068 A1 2/2004
CN 101164084 A 4/2008
(Continued)

OTHER PUBLICATIONS

A.J. Davison, "Real-Time Simultaneous Localisation and Mapping with a Single Camera", Proceedings of the 9th IEEE International Conference on Computer Vision, vol. 2, pp. 1403-1410 (reprint shows pp. 1-8) (2003).
(Continued)

Primary Examiner — Phi Hoang
(74) Attorney, Agent, or Firm — Paratus Law Group, PLLC

(57) ABSTRACT

There is provided an image processing device including: a data storage unit storing feature data indicating a feature of appearance of one or more physical objects; an environment map building unit for building an environment map based on an input image obtained by imaging a real space and the feature data, the environment map representing a position of a physical object present in the real space; a control unit for acquiring procedure data for a set of procedures of operation to be performed in the real space, the procedure data defining a correspondence between a direction for each procedure and position information designating a position at which the direction is to be displayed; and a superimposing
(Continued)

unit for generating an output image by superimposing the direction for each procedure at a position in the input image determined based on the environment map and the position information, using the procedure data.

17 Claims, 18 Drawing Sheets

Related U.S. Application Data continuation of application No. 16/668,862, filed on Oct. 30, 2019, now Pat. No. 10,810,803, which is a continuation of application No. 16/263,524, filed on Jan. 31, 2019, now Pat. No. 10,515,488, which is a continuation of application No. 16/026,763, filed on Jul. 3, 2018, now Pat. No. 10,223,837, which is a continuation of application No. 15/713,801, filed on Sep. 25, 2017, now Pat. No. 10,037,628, which is a continuation of application No. 14/991,477, filed on Jan. 8, 2016, now Pat. No. 9,805,513, which is a continuation of application No. 14/869,063, filed on Sep. 29, 2015, now Pat. No. 9,754,418, which is a continuation of application No. 14/527,148, filed on Oct. 29, 2014, now Pat. No. 9,183,678, which is a continuation of application No. 12/984,847, filed on Jan. 5, 2011, now Pat. No. 8,896,628.

(51) Int. Cl.
  *G02B 27/01* (2006.01)
  *G06T 11/60* (2006.01)

(52) U.S. Cl.
  CPC ............ *G06T 19/003* (2013.01); *G09G 5/00* (2013.01); *G02B 2027/014* (2013.01)

(56) References Cited

U.S. PATENT DOCUMENTS

| | | |
|---|---|---|
| 2004/0080467 A1 | 4/2004 | Chinthammit |
| 2005/0093889 A1 | 5/2005 | Sauer et al. |
| 2007/0136269 A1 | 6/2007 | Yamakabe et al. |
| 2007/0242131 A1 | 10/2007 | Sanz-Pastor et al. |
| 2007/0273610 A1 | 11/2007 | Baillot |
| 2008/0304707 A1 | 12/2008 | Oi et al. |
| 2009/0189974 A1 | 7/2009 | Deering |
| 2009/0245681 A1 | 10/2009 | Kobayashi |
| 2010/0033404 A1 | 2/2010 | Hamadou et al. |
| 2010/0208057 A1 | 8/2010 | Meier et al. |
| 2010/0240988 A1 | 9/2010 | Varga et al. |
| 2011/0021180 A1 | 1/2011 | Ray |
| 2011/0134114 A1 | 6/2011 | Rais et al. |
| 2011/0143811 A1 | 6/2011 | Rodriguez |
| 2012/0225413 A1 | 9/2012 | Kotranza et al. |

FOREIGN PATENT DOCUMENTS

| | | |
|---|---|---|
| CN | 101164087 A | 4/2008 |
| CN | 101243392 A | 8/2008 |
| CN | 101311893 A | 11/2008 |
| GB | 2376397 A | 12/2002 |
| JP | 2003-281297 A | 10/2003 |
| JP | 2008-304268 A | 12/2008 |
| JP | 2009-037392 A | 2/2009 |

OTHER PUBLICATIONS

Dec. 2, 2014, Japanese communication issued for related JP application No. 2010-021368.

Henderson et al., Augmented Reality for Maintenance and Repair (ARMAR), Aug. 2007, p. i-62, Columbia University and Air Force Research Laboratory, New York, NY.

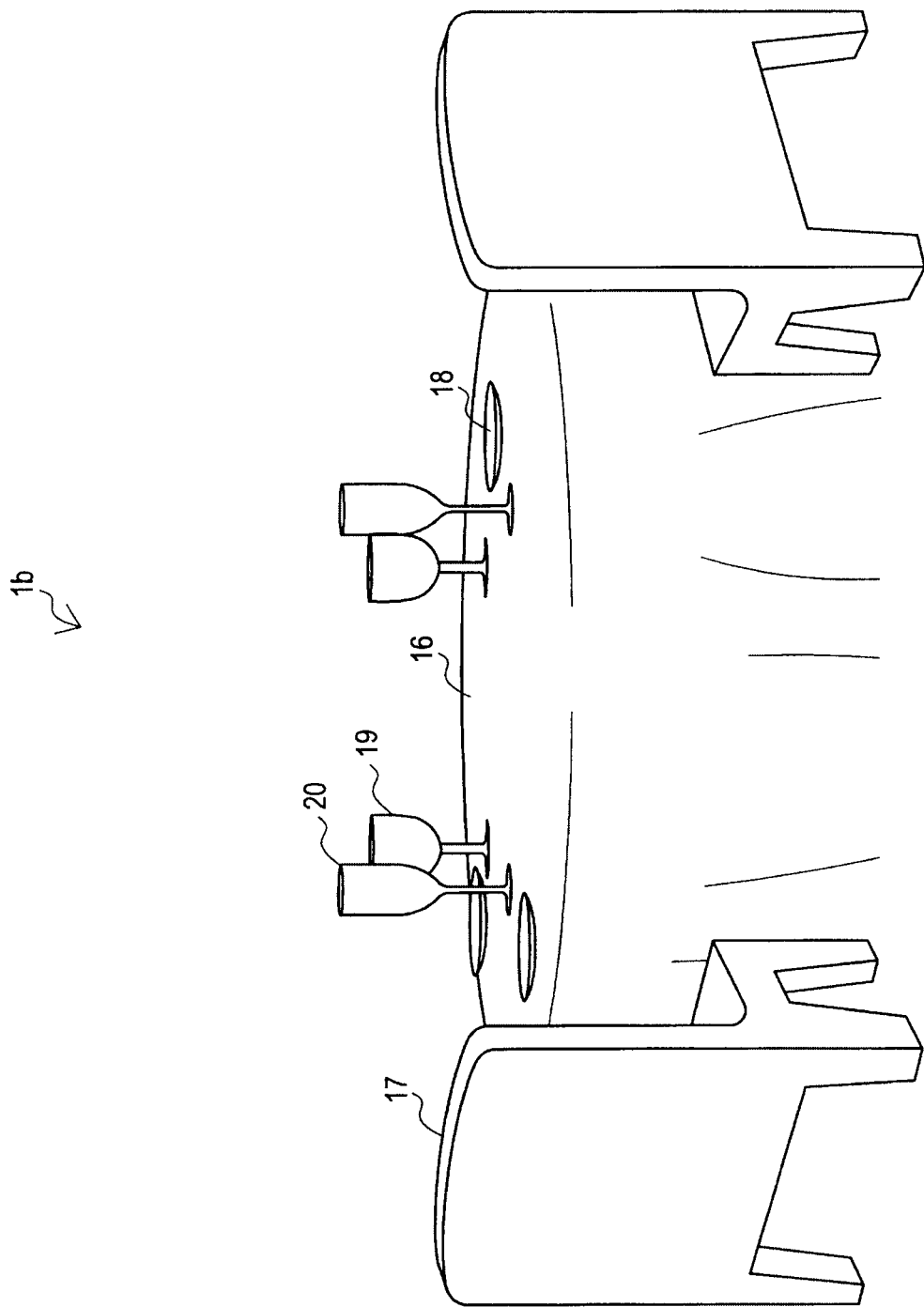

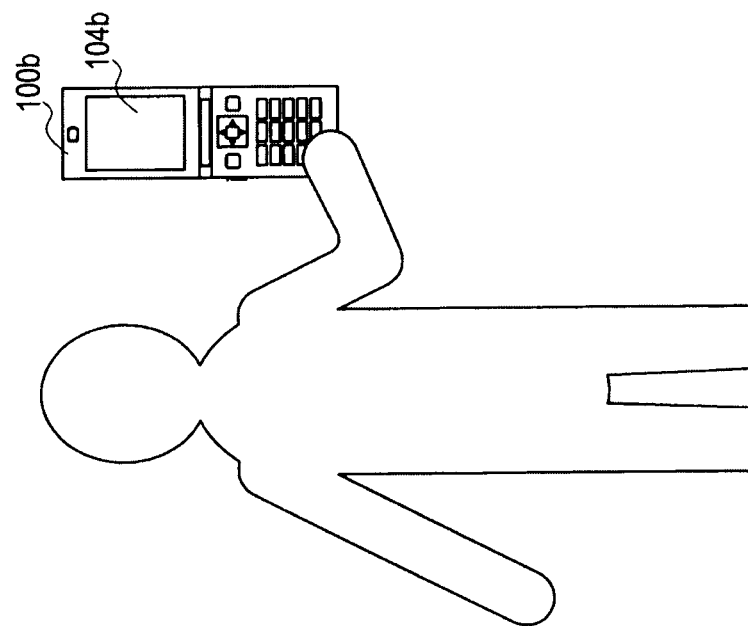
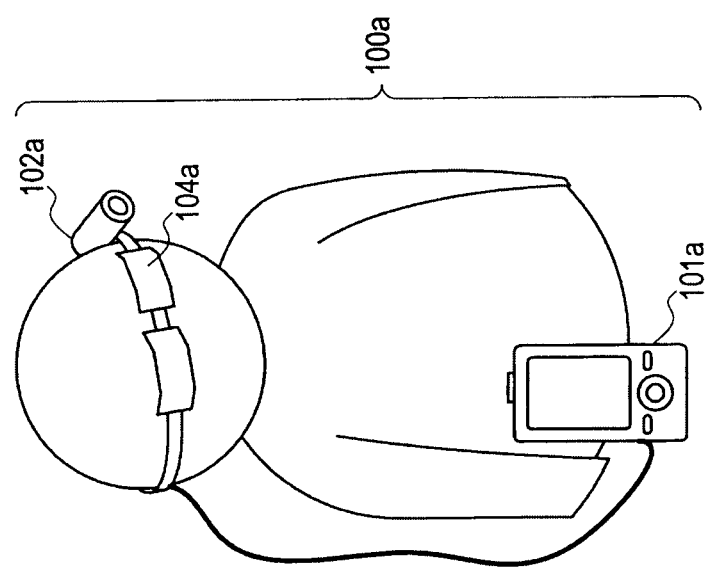

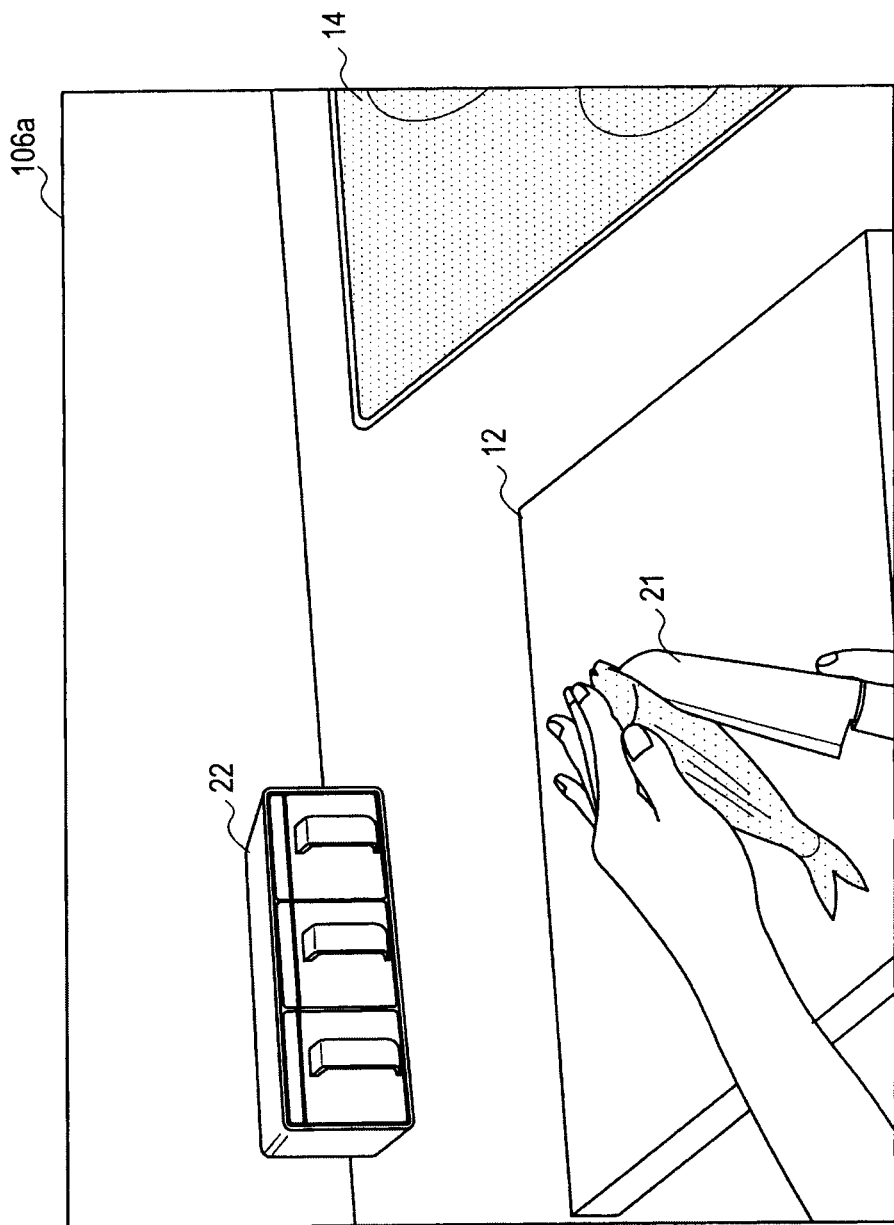

FEATURE DATA EXAMPLE

FD1
- OBJECT NAME: COFFEE CUP A (FD11)
- IMAGE DATA TAKEN FROM SIX DIRECTIONS (FD12)
- PATCH DATA (FD13)
- THREE-DIMENSIONAL SHAPE DATA (FD14)
  - POLYGON INFORMATION
  - FEATURE POINT POSITION INFORMATION (RELATIVE COORDINATE)
- ONTOLOGY DATA (FD15)
  - OBJECT MORE LIKELY TO CONTACT: DESK, DISHWASHER
  - OBJECT LESS LIKELY TO CONTACT: BOOKSHELF

FIG.11

| NAME OF DIRECTIONS | PROCEDURE ID | PROCEDURE DESCRIPTION | RELATED PHYSICAL OBJECT | PROGRESS CONDITION |
|---|---|---|---|---|
| TABLE MANNER | P101 | SEAT FROM LEFT SIDE OF CHAIR | CHAIR | SEAT |
| | P102 | ORDER FOOD AND DRINK | MENU | MENU IS PUT DOWN |
| | P103 | SET NAPKIN ON YOUR LAP | NAPKIN | NAPKIN IS ON CHAIR |
| | .. | .. | .. | .. |
| FRIED EGG | P201 | DIVIDE AND STIR EGGS | BOWL | ONE MINUTE ELAPSES |
| | P202 | FRYING PAN TO STOVE | FRYING PAN | FRYING PAN IS ON STOVE |
| | P203 | PUT THE EGGS ONTO FRYING PAN | STOVE | 30 SECONDS ELAPSE FROM STOVE IGNITION |
| | P204 | SPRINKLE SALT AND PEPPER | CRUET | 90 SECONDS ELAPSE FROM STOVE IGNITION |
| | .. | .. | .. | .. |

182

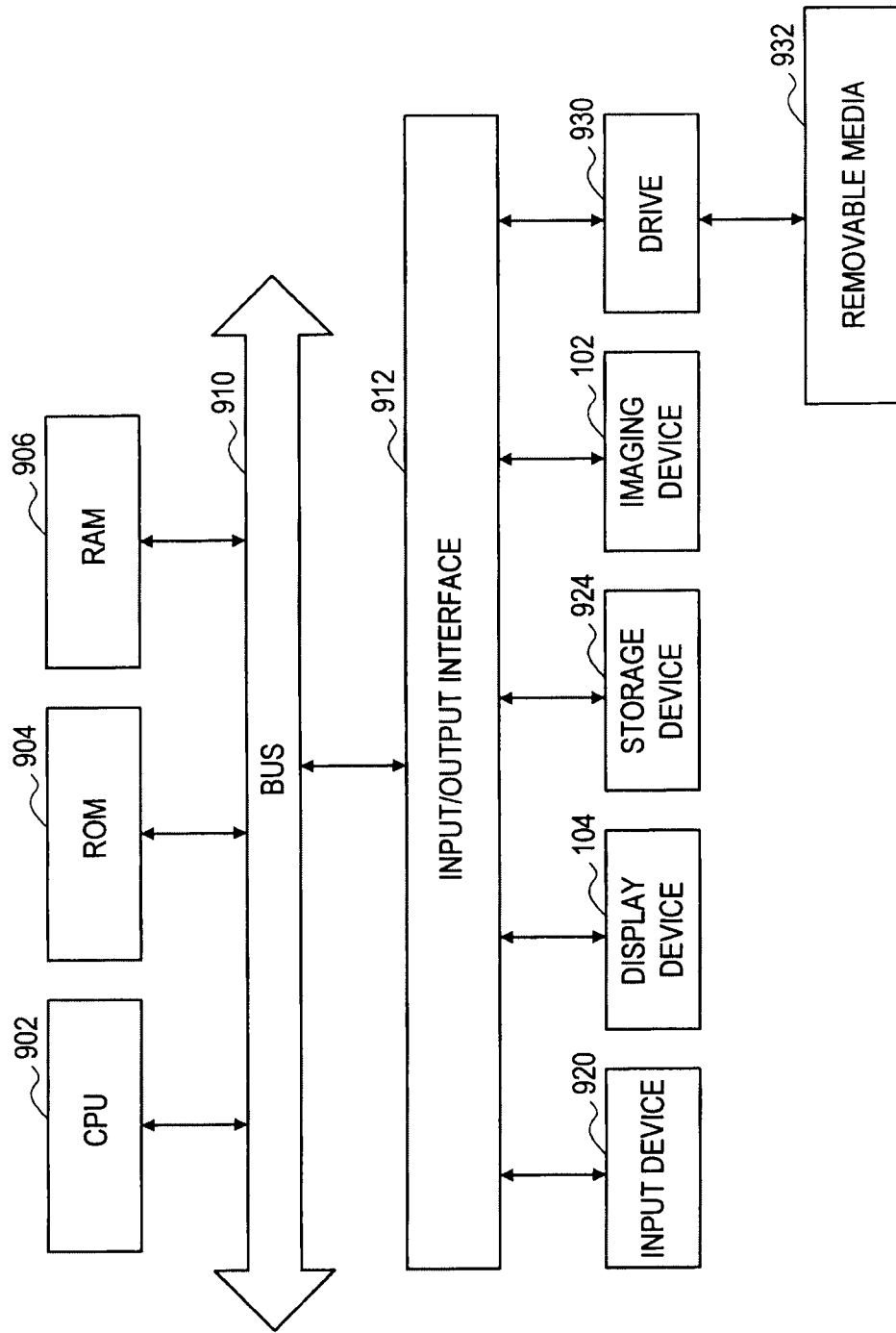

IMAGE PROCESSING DEVICE, IMAGE PROCESSING METHOD, AND PROGRAM

CROSS-REFERENCE TO PRIOR APPLICATION

This application is a continuation of U.S. patent application Ser. No. 17/069,389 (filed on Oct. 13, 2020), which is a continuation of U.S. patent application Ser. No. 16/668, 862 (filed on Oct. 30, 2019 and issued as U.S. Pat. No. 10,810,803 on Oct. 20, 2020), which is a continuation of U.S. patent application Ser. No. 16/263,524 (filed on Jan. 31, 2019 and issued as U.S. Pat. No. 10,515,488 on Dec. 24, 2019), which is a continuation of U.S. patent application Ser. No. 16/026,763 (filed on Jul. 3, 2018 and issued as U.S. Pat. No. 10,223,837 on Mar. 5, 2019), which is a continuation of U.S. patent application Ser. No. 15/713,801 (filed on Sep. 25, 2017 and issued as U.S. Pat. No. 10,037,628 on Jul. 31, 2018), which is a continuation of U.S. patent application Ser. No. 14/991,477 (filed on Jan. 8, 2016 and issued as U.S. Pat. No. 9,805,513 on Oct. 31, 2017), which is a continuation of U.S. patent application Ser. No. 14/869,063 (filed on Sep. 29, 2015 and issued as U.S. Pat. No. 9,754,418 on Sep. 5, 2017), which is a continuation of U.S. patent application Ser. No. 14/527,148 (filed on Oct. 29, 2014 and issued as U.S. Pat. No. 9,183,678 on Nov. 10, 2015), which is a continuation of U.S. patent application Ser. No. 12/984,847 (filed on Jan. 5, 2011 and issued as U.S. Pat. No. 8,896,628 on Nov. 25, 2014), which claims priority to Japanese Patent Application No. 2010-021368 (filed on Feb. 2, 2010), which are all hereby incorporated by reference in their entirety.

BACKGROUND OF THE INVENTION

Field of the Invention

The present invention relates to an image processing device, an image processing method, and a program.

Description of the Related Art

Recently, technology called augmented reality (AR) in which an image obtained by imaging a real space is processed and then presented to a user has been receiving attention. In the AR technology, useful information related to a physical object in a real space present in an input image may be inserted into the image and output as an output image, for example. That is, in the AR technology, typically, a large part of the image presented to the user shows the real space, and a part of the image may be processed in accordance with a purpose. Such a characteristic contrasts it with virtual reality in which an entire (or a large part) of the output image is composed using computer graphics (CG). By using the AR technology, for example, advantages such as easy recognition of a situation of the real space by a user or operation support based on the output image may be provided.

In the AR technology, in order to present actually useful information to the user, it is important that a computer accurately recognize a situation of the real space. Therefore, technology aimed at recognizing the situation of the real space, which serves as a basis of the AR technology, has been developed. For example, Japanese Patent Application Laid-Open Publication No. 2008-304268 discloses a method of dynamically generating an environment map representing a three-dimensional position of physical objects existing in a real space by applying technology called simultaneous localization and mapping (SLAM) capable of simultaneously estimating a position and a posture of a camera and a position of a feature point shown in an image of the camera. Further, a basic principle of the SLAM technology using a monocular camera is disclosed in Andrew J. Davison's, "Real-Time Simultaneous Localization and Mapping with a Single Camera," Proceedings of the 9th IEEE International Conference on Computer Vision Volume 2, 2003, pp. 1403-1410.

Now, information terminals capable of performing enhanced information processing are widely used and users use the information terminals to view various information. An example of the information includes directions. For example, various information, such as table manners, a cooking procedure, a method of manipulating or repairing electrical appliances, or the like, as well as directions of electronic devices, describing a procedure of an operation to be performed in a real space are made in an electronic form and provided to the users via web pages or other applications.

SUMMARY OF THE INVENTION

However, existing electronic directions are generally described based on the premise that the electronic directions are displayed on a two-dimensional screen, like paper directions. Accordingly, some information about positions of operation in a three-dimensional real space is missed, often making it difficult for a user to intuitively understand a procedure of the operation. In particular, for an operation in a real space in which an environment surrounding a user may be dynamically changed, such environment is not described in the directions, making it more difficult to understand the directions.

Accordingly, if an environment map three-dimensionally representing an environment surrounding a user can be dynamically built and a direction for each procedure of the operation can be displayed in a position associated with the environment map, the operation procedure is expected to be intuitively and easily understood by the user.

In light of the foregoing, it is desirable to provide an image processing device, an image processing method, and a program which allow an operation procedure performed in a real space to be intuitively and easily understood by applying an environment map.

According to an embodiment of the present invention, there is provided an image processing device including: a data storage unit having feature data stored therein, the feature data indicating a feature of appearance of one or more physical objects; an environment map building unit for building an environment map based on an input image obtained by imaging a real space using an imaging device and the feature data stored in the data storage unit, the environment map representing a position of a physical object present in the real space; a control unit for acquiring procedure data for a set of procedures of operation to be performed in the real space, the procedure data defining a correspondence between a direction for each procedure and position information designating a position at which the direction is to be displayed; and a superimposing unit for generating an output image by superimposing the direction for each procedure included in the set of procedures at a position in the input image determined based on the environment map and the position information, using the procedure data acquired by the control unit.

According to such a configuration, the direction for each procedure included in a set of procedures of operation to be performed in the real space is superimposed at a position in the input image determined based on the environment map three-dimensionally representing positions of physical objects present in the real space, according to definition by procedure data.

The position information may designate a position in the environment map at which the direction is to be displayed, by specifying a physical object related to the direction for each procedure.

The procedure data may define a further correspondence between the direction for each procedure and a condition for progressing displaying of each direction.

The condition for progressing displaying of each direction may include a condition according to a position or a posture of a physical object represented by the environment map.

The control unit may control displaying of the direction for each procedure included in the set of procedures according to the procedure data.

The image processing device may further include a detection unit for dynamically detecting a position in the real space of the imaging device based on the input image and the feature data, and the position in the input image at which the direction for each procedure is to be superimposed may be determined according to the position in the real space of the imaging device detected by the detection unit.

According to another embodiment of the present invention, there is provided an image processing method in an image processing device including a storage medium having feature data stored therein, the feature data indicating a feature of appearance of one or more physical objects, the method including the steps of: acquiring an input image obtained by imaging a real space using an imaging device; building an environment map based on the input image and the feature data, the environment map representing a position of a physical object present in the real space; acquiring procedure data for a set of procedures of operation to be performed in the real space, the procedure data defining a correspondence between a direction for each procedure and position information designating a position at which the direction is to be displayed; and generating an output image by superimposing the direction for each procedure included in the set of procedures at a position in the input image determined based on the environment map and the position information, using the acquired procedure data.

According to another embodiment of the present invention, there is provided a program for causing a computer, which controls an image processing device including a storage medium having feature data stored therein, the feature data indicating a feature of appearance of one or more physical objects, to function as: an environment map building unit for building an environment map based on an input image obtained by imaging a real space using an imaging device and the feature data, the environment map representing a position of a physical object present in the real space; a control unit for acquiring procedure data for a set of procedures of operation to be performed in the real space, the procedure data defining a correspondence between a direction for each procedure and position information designating a position at which the direction is to be displayed; and a superimposing unit for generating an output image by superimposing the direction for each procedure included in the set of procedures at a position in the input image determined based on the environment map and the position information, using the procedure data acquired by the control unit.

As described above, according to an image processing device, an image processing method, and a program in an embodiment of the present invention, it is possible to enable an operation procedure performed in the real space to be intuitively and easily understood by applying the environment map.

BRIEF DESCRIPTION OF THE DRAWINGS

FIG. 1B is a schematic diagram showing a second example of the environment in which the image processing device can be used according to the embodiment;

FIG. 2A is a first illustrative diagram for illustrating an image processing device according to an embodiment;

FIG. 2B is a second illustrative diagram for illustrating an image processing device according to an embodiment;

FIG. 3A is an illustrative diagram showing an example of an input image that can be acquired in a real environment shown in FIG. 1A;

FIG. 11 an illustrative diagram for illustrating an example of procedure data that can be acquired in an embodiment;

FIG. 16 is a block diagram showing an example of a hardware configuration of a general-purpose computer.

DETAILED DESCRIPTION OF THE EMBODIMENT(S)

Figure 1A:
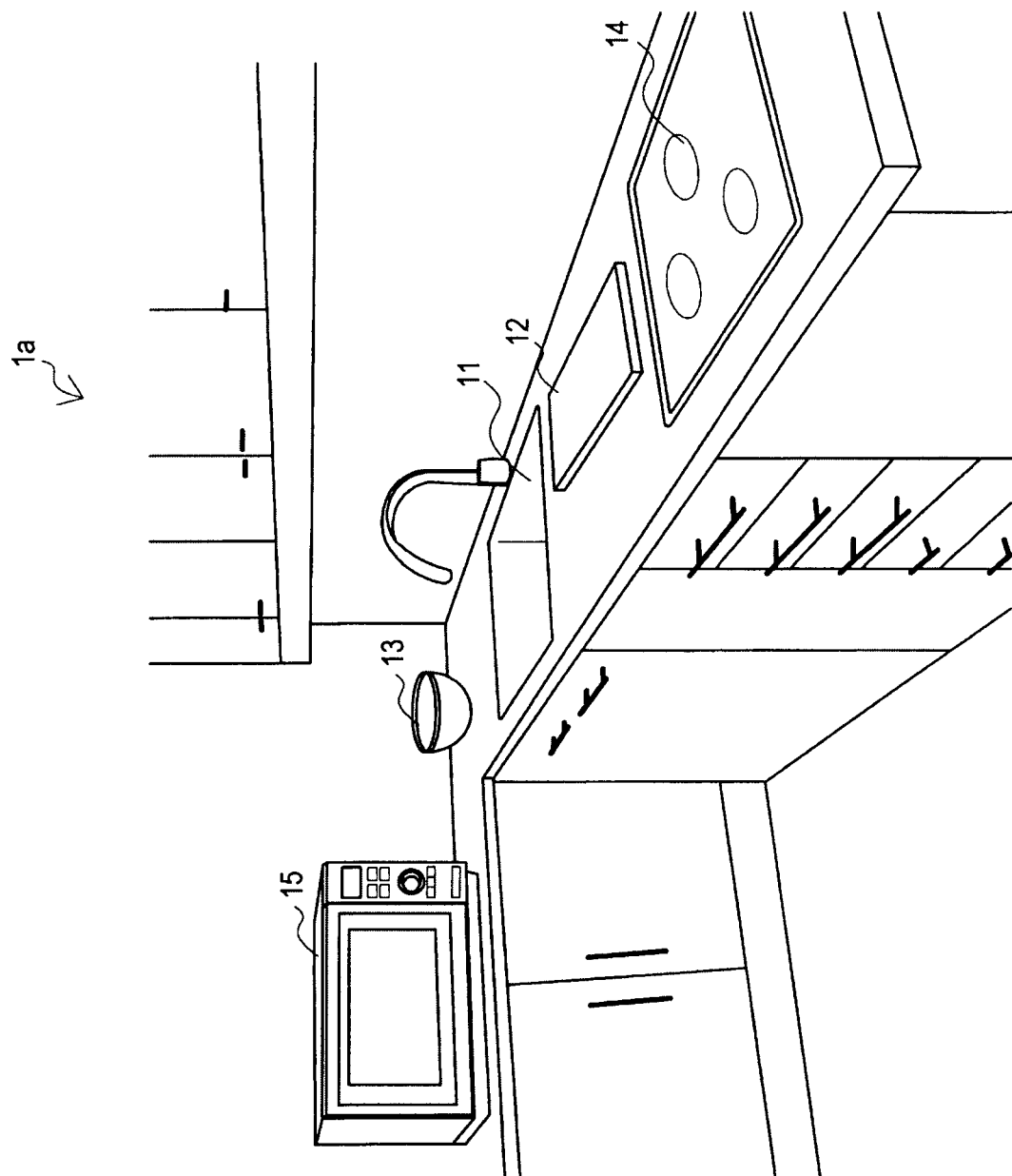
FIG. 1A is a schematic diagram showing a first example of an environment in which an image processing device can be used according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Also, the "detailed description of the embodiment(s)" will be described in the following order.

1. Overview of Image Processing Device
2. Configuration of Image Processing Device according to Embodiment
  2-1. Imaging unit
  2-2. Environment Map Generating Unit
  2-3. Output Image Generating Unit
  2-4. Example of Output Image
3. Example of Hardware Configuration
4. Conclusion

1. Overview of Image Processing Device

First, an overview of an image processing device according to an embodiment of the present invention will be described with reference to FIGS. 1A to 3B. FIGS. 1A and 1B show environments 1a and 1b, for example, in which the image processing device 100 according to an embodiment of the present invention can be used, respectively.

Referring to FIG. 1A, a sink 11, a cutting board 12, a bowl 13, a stove 14, a microwave oven 15, and other physical objects are present in the environment 1a. That is, the environment 1a is an environment corresponding to a kitchen as a real space where a user prepares food. Meanwhile, referring to FIG. 1B, a table 16, chairs 17, dishes 18, glasses 19 and 20, and other physical objects are present in an environment 1b. That is, the environment 1b is an environment corresponding to a dining room (or guest seating of a restaurant) as a real space where a user dines.

FIGS. 2A and 2B are illustrative diagrams for illustrating an image processing device 100 that may be used inside the environment 1a or 1b, for example, as described above.

Referring to FIG. 2A, an image processing device 100a including a body 101a, an imaging device 102a and a display device 104a, which are mounted to a user, is shown. The body 101a includes a central processing unit (CPU) for executing image processing in the image processing device 100, which will be described in detail later, a storage medium, and the like. The imaging device 102a is mounted to a head portion of the user in the same direction as a user's gaze, to image the inside of the environment 1a or 1b to generate a set of input images. The image processing device 100a executes image processing using the set of input images generated by the imaging device 102a as an input to generate a set of output images. The output images generated by the image processing device 100a are displayed by the display device 104a. The display device 104a is a head mount display mounted to the head portion of the user. The display device 104a may be, for example, a see-through display.

Referring to FIG. 2B, an image processing device 100b such as a mobile phone terminal held by the user is shown. The image processing device 100b is, for example, a mobile phone terminal with an imaging device, and includes an imaging device (e.g., provided at the rear of a display device 104b) and the display device 104b. The image processing device 100b includes a CPU for executing image processing in the image processing device 100, which will be described in detail later, a storage medium, and the like.

In this disclosure, when the image processing devices 100a and 100b need not be discriminated from each other, letters of the reference numerals are omitted to collectively refer to the image processing devices 100a and 100b as the image processing device 100. Also, the same applies to the imaging devices 102a and 102b (imaging device 102), the display devices 104a and 104b (display device 104) and other elements.

Figure 3B:
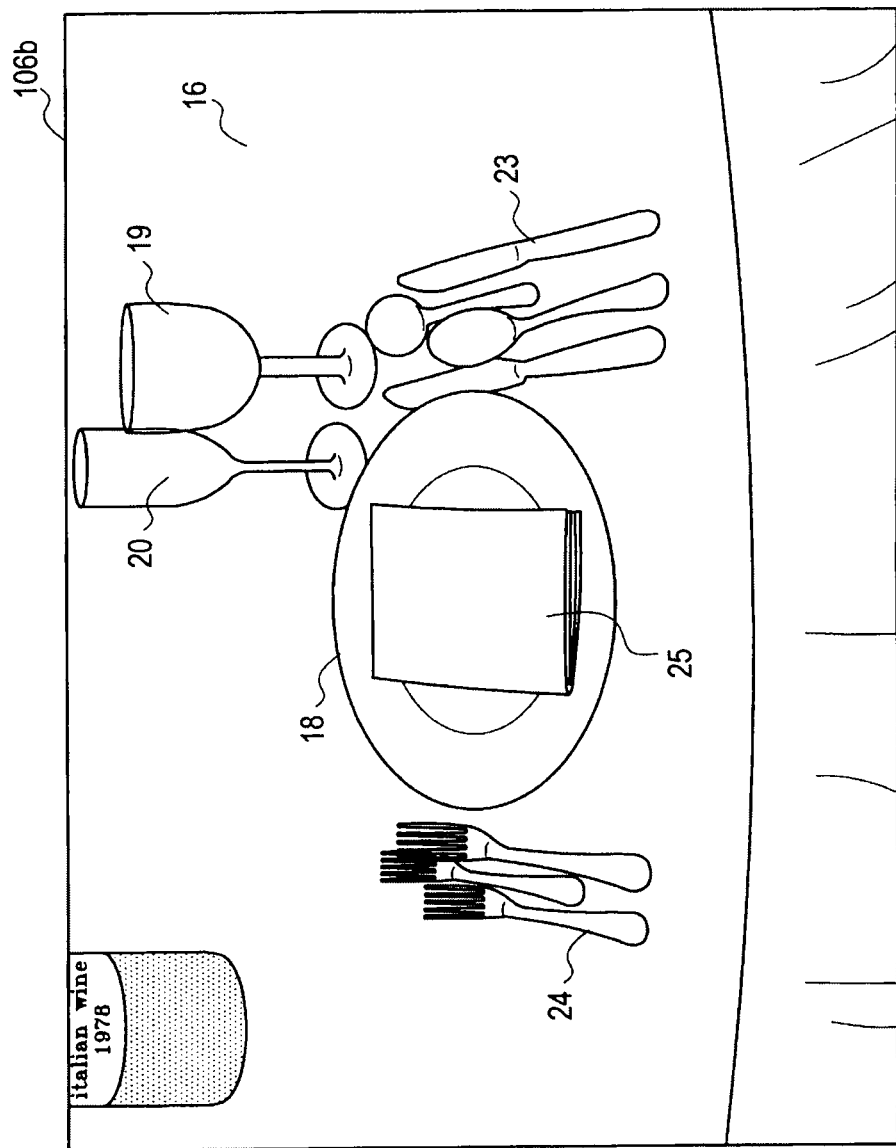
FIG. 3B is an illustrative diagram showing an example of an input image that can be acquired in a real environment shown in FIG. 1B.

FIGS. 3A and 3B are illustrative diagrams showing input images 106a and 106b, for example, acquired by the imaging device 102 imaging the environments 1a and 1b, respectively.

Referring to FIG. 3A, a cutting board 12, a stove 14, a kitchen knife 21, a cruet 22 and other physical objects are shown in the input image 106a. The input image 106a is the same image as an image shown in the vision of the user preparing food in the environment 1a. The image processing device 100 acquires a set of input images including such an input image 106a, for example, using the imaging device 102, and superimposes a direction for a cooking procedure on each input image.

Referring to FIG. 3B, a table 16, a dish 18, glasses 19 and 20, a knife 23, forks 24, a napkin 25 and other physical objects are shown in an input image 106b. The input image 106b is the same image as an image shown in the vision of a user dining in the environment 1b. The image processing device 100 acquires a set of input images including such an input image 106b, for example, using the imaging device 102 and superimposes a direction for table manners during the meal on each input image.

An example of a configuration of such an image processing device 100 will be described in greater detail in the next section.

2. Configuration of Image Processing Device According to Embodiment

Figure 4:
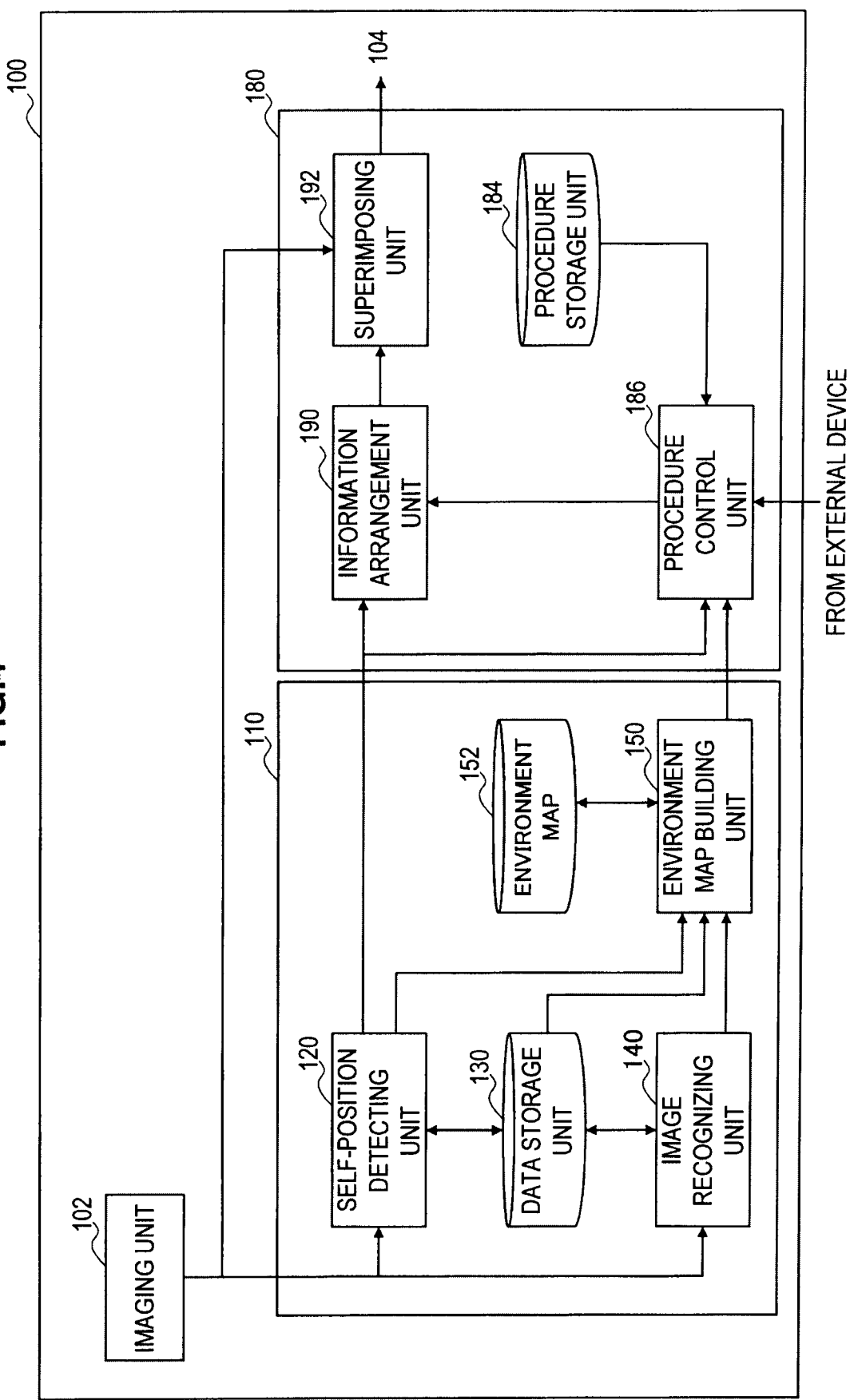
FIG. 4 is a block diagram showing an example of a configuration of an image processing device according to an embodiment.

FIG. 4 is a block diagram showing an example of a configuration of the image processing device 100 according to an embodiment of the present invention. Referring to FIG. 4, the image processing device 100 includes an imaging unit 102, an environment map generating unit 110, and an output image generating unit 180.

[2-1. Imaging Unit]

The imaging unit 102 may be realized as an imaging device having an imaging element such as a charge coupled device (CCD) or a complementary metal oxide semiconductor (CMOS), for example. The imaging unit 102 may be provided outside the image processing device 100. The imaging unit 102 outputs an image acquired by imaging the real space such as the environment 1a or the environment 1b to the environment map generating unit 110 and the output image generating unit 180 as the input image.

[2-2. Environment Map Generating Unit]

The environment map generating unit 110 generates an environment map representing, for example, positions of one or more physical objects present in the real space based on the input image input from the imaging unit 102 and feature data of an object, which will be described later, stored in a data storage unit 130. As shown in FIG. 4, in this embodiment, the environment map generating unit 110 includes a self-position detecting unit 120, the data storage unit 130, an image recognizing unit 140, an environment map building unit 150 and an environment map storage unit 152.

(1) Self-Position Detection Unit

The self-position detecting unit 120 dynamically detects a position of the imaging device, which takes the input image, based on the input image input from the imaging unit 102 and the feature data stored in the data storage unit 130. For example, even in a case in which the imaging device has a monocular camera, the self-position detecting unit 120 may dynamically determine a position and posture of the camera and a position of a feature point (FP) on an imaging plane of the camera for each frame by applying the SLAM technology disclosed in Andrew J. Davison's "Real-Time Simultaneous Localization and Mapping with a Single Camera." Proceedings of the 9th IEEE International Conference on Computer Vision Volume 2, 2003, pp. 1403-1410.

First, entire flow of a self-position detection process in the self-position detecting unit 120 to which the SLAM technology is applied will be described with reference to FIG. 5. Next, the self-position detection process will be described in detail with reference to FIGS. 6 to 8.

Figure 5:
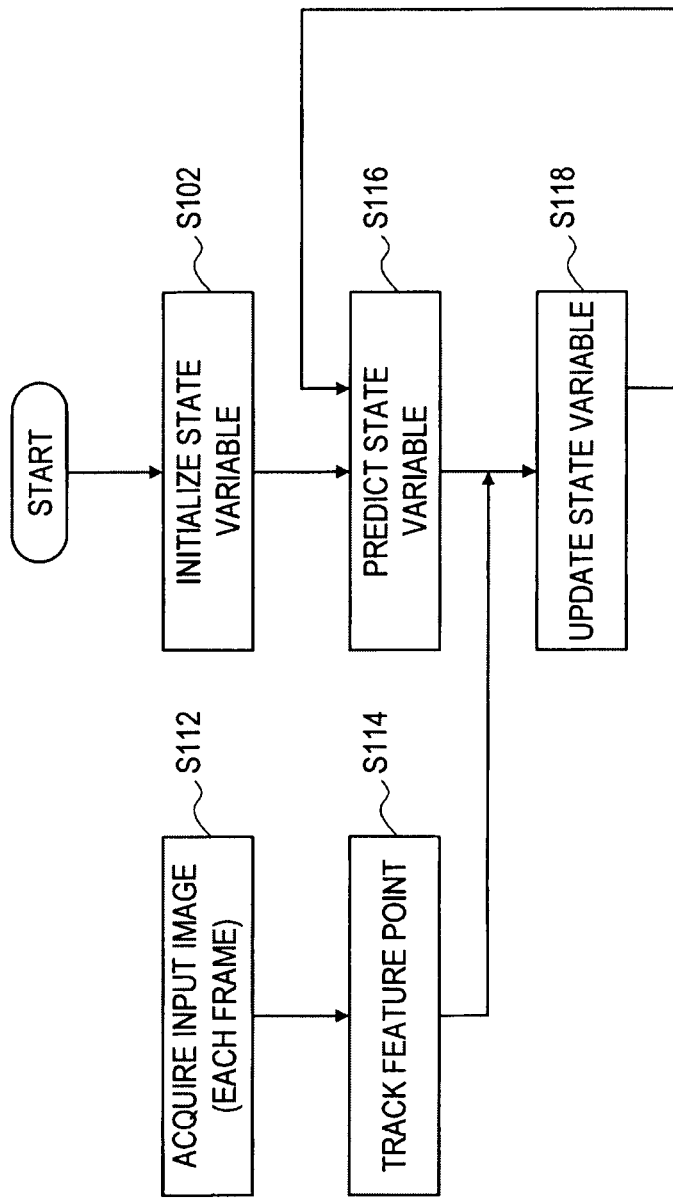
FIG. 5 is a flowchart showing an example of flow of a self-position detection process according to an embodiment.

FIG. 5 is a flowchart showing an example of the flow of the self-position detection process in the self-position detecting unit 120 to which the SLAM technology is applied. In FIG. 5, when the self-position detection process starts, the self-position detecting unit 120 first initializes a state variable (step S102). In this embodiment, the state variable is a vector including the position and the posture (rotation angle) of the camera, a moving speed and an angular speed of the camera and the position of one or more FPs as elements. The self-position detecting unit 120 then sequentially obtains the input image from the imaging unit 102 (step S112). The process from step S112 to step S118 may be repeated for each input image (i.e., each frame).

In step S114, the self-position detecting unit 120 tracks FPs present in the input image. For example, the self-position detecting unit 120 detects a patch (small image of 3×3=9 pixels around a FP, for example) of each FP stored in advance in the data storage unit 130 from the input image. The position of the patch detected herein, that is, the position of the FP, is used to update the state variable later.

In step S116, the self-position detecting unit 120 generates, for example, a predicted value of the state variable of a next frame based on a given prediction model. Also, in step S118, the self-position detecting unit 120 updates the state variable using the predicted value of the state variable generated in step S116 and an observed value according to the position of the FP detected in step S114. The self-position detecting unit 120 executes the process in steps S116 and S118 based on a principle of an extended Kalman filter.

As a result of such a process, a value of the state variable updated for each frame is output. Hereinafter, contents of respective processes of tracking the FP (step S114), prediction of the state variable (step S116) and updating the state variable (step S118) will be described more specifically.

(1-1) Tracking of FP

In this embodiment, the data storage unit 130 stores the feature data indicating features of objects corresponding to physical objects which may be present in the real space, in advance. The feature data includes small images, that is, the patches regarding one or more FPs, each representing the feature of appearance of each object, for example. The patch may be the small image composed of 3×3=9 pixels around the FP, for example.

Figure 6:
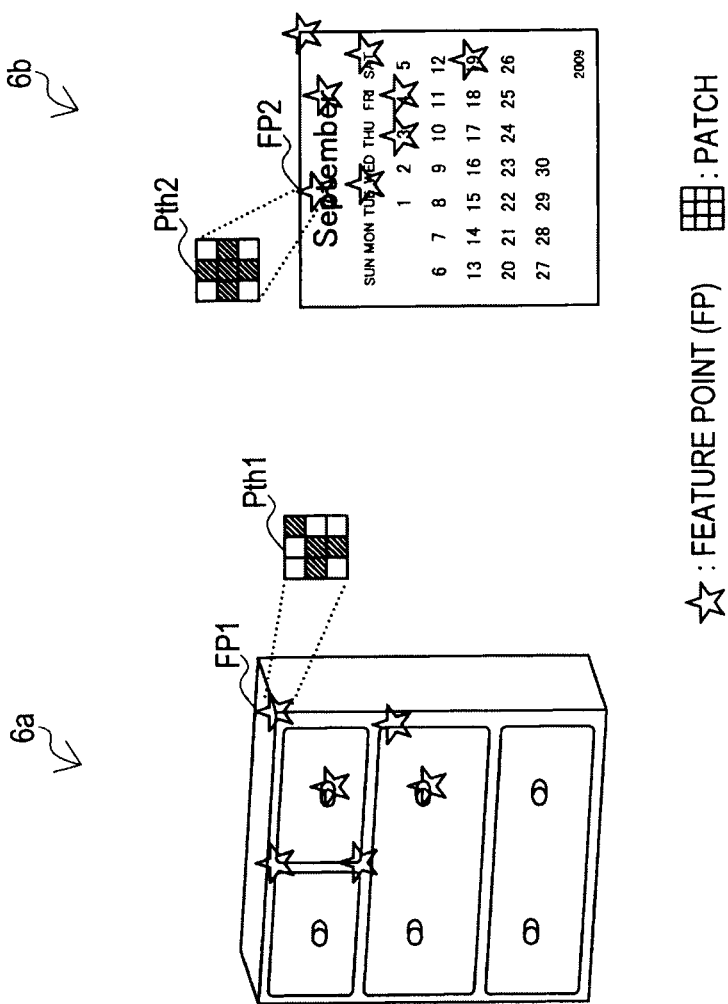
FIG. 6 is an illustrative diagram for illustrating a feature point set on an object.
Figure 7:
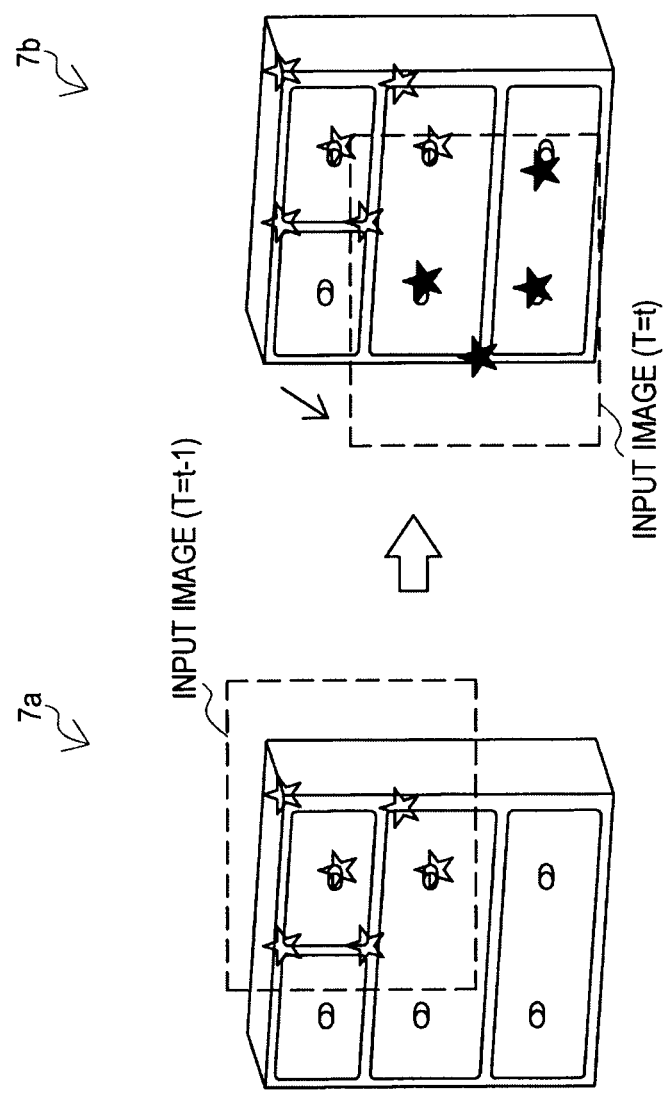
FIG. 7 is an illustrative diagram for illustrating addition of feature points.

FIG. 6 shows two examples of the objects and an example of FPs and patches set on each object. A left object in FIG. 6 is the object representing a drawer (see FIG. 6a). A plurality of FPs including a feature point FP1 are set on the object. Further, a patch Pth1 is defined to be associated with the feature point FP1. On the other hand, a right object in FIG. 6 is the object representing a calendar (see FIG. 6b). A plurality of FPs including a feature point FP2 are set on the object. Further, a patch Pth2 is defined to be associated with the feature point FP2.

When the input image is acquired from the imaging unit 102, the self-position detecting unit 120 matches partial images included in the input image against the patch for each FP illustrated in FIG. 6 stored in advance in the data storage unit 130. The self-position detecting unit 120 then specifies a position of each FP included in the input image (a position of a center pixel of the detected patch, for example) as the result of matching.

Further, in tracking of the FPs (step S114 in FIG. 5), data regarding all the FPs to be tracked may not be stored in the data storage unit 130 in advance. For example, six FPs are detected in the input image at time T=t−1 in an example of FIG. 7 (see FIG. 7a). Next, when the position or the posture of the camera changes at time T=t, only two of the six FPs present in the input image at the time T=t−1 are present in the input image. In this case, the self-position detecting unit 120 may newly set FPs in positions where a characteristic pixel pattern of the input image is present and use the new FPs in the self-position detection process for a subsequent frame. For example, in the example shown in FIG. 7, four new FPs are set on the object at the time T=t (see FIG. 7b). This is a characteristic of the SLAM technology, and accordingly, a cost of setting all of the FPs in advance can be reduced and accuracy of the process can be improved using a number of added FPs.

(1-2) Prediction of State Variable

In this embodiment, the self-position detecting unit 120 uses a state variable X shown in the following equation as the state variable to be applied with the extended Kalman filter.

[Equation 1]

$$X = \begin{pmatrix} x \\ \omega \\ \dot{x} \\ \dot{\omega} \\ p_1 \\ \vdots \\ p_N \end{pmatrix} \quad (1)$$

The first element of the state variable X in Equation (1) represents a three-dimensional position of the camera in a global coordinate system (x, y, z) being a coordinate system set in the real space, as in the following equation.

[Equation 2]

$$x = \begin{pmatrix} x_c \\ y_c \\ z_c \end{pmatrix} \quad (2)$$

Also, the second element of the state variable is a four-dimensional vector ω having a quaternion as an element corresponding to a rotation matrix representing the posture of the camera. The posture of the camera may be represented using an Euler angle in place of the quaternion. Also, the third and the fourth elements of the state variable represent the moving speed and the angular speed of the camera, respectively.

Further, the fifth and subsequent elements of the state variable represent a three-dimensional position $p_i$ of a FP $FP_1$ (i=1 . . . N) in the global coordinate system as shown in a following equation. Further, as described above, the number N of the FPs may change during the process.

[Equation 3]

$$p_i = \begin{pmatrix} x_i \\ y_i \\ z_i \end{pmatrix} \quad (3)$$

The self-position detecting unit 120 generates the predicted value of the state variable for a latest frame based on the value of the state variable X initialized in step S102 or the value of the state variable X updated in a previous frame. The predicted value of the state variable is generated according to a state equation of the extended Kalman filter according to multi-dimensional normal distribution shown in the following equation.

[Equation 4]

$$\text{predicted state variable } \hat{X} = F(X, a) + w \quad (4)$$

Here, F denotes the prediction model regarding state transition of a system, a denotes a prediction condition. Also, w denotes Gaussian noise and may include a model approximation error, an observation error and the like, for example. In general, an average of the Gaussian noise w is 0.

Figure 8:
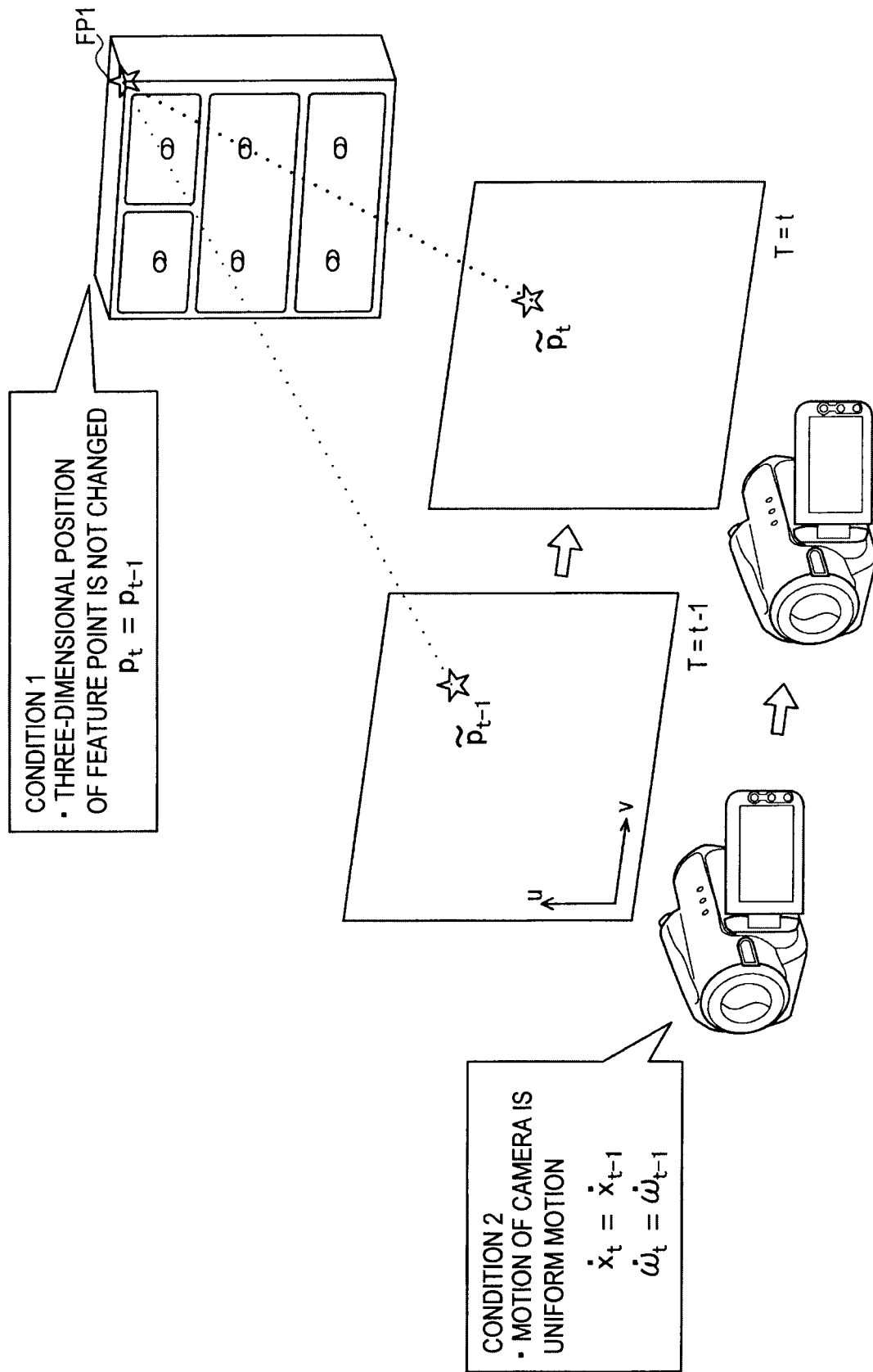
FIG. 8 is an illustrative diagram for illustrating an example of a prediction model.

FIG. 8 is an illustrative diagram for illustrating an example of the prediction model according to this embodiment. Referring to FIG. 8, two prediction conditions in the prediction model according to this embodiment are shown. First, as a first condition, it is assumed that the three-dimensional position of the FP in the global coordinate system does not change. That is, provided that the three-dimensional position of the FP FP1 at the time T is $p_T$, the following relationship is satisfied.

[Equation 5]

$$p_t = p_{t-1} \quad (5)$$

Next, as a second condition, it is assumed that motion of the camera is uniform motion. That is, a following relationship is satisfied for the speed and the angular speed of the camera from the time T=t−1 to the time T=t.

[Equation 6]

$$\dot{x}_t = \dot{x}_{t-1} \quad (6)$$

$$\dot{\omega}_t = \dot{\omega}_{t-1} \quad (7)$$

The self-position detecting unit 120 generates the predicted value of the state variable for the latest frame based on such a prediction model and the state equation expressed in Equation (4).

(1-3) Updating of State Variable

The self-position detecting unit 120 then evaluates an error between observation information predicted from the predicted value of the state variable and actual observation information obtained as a result of FP tracking, using an observation equation, for example. Note that v in Equation (8) is the error.

[Equation 7]

$$\text{observation information } s = H(\hat{X}) + v \quad (8)$$

$$\text{predicted observation information } \hat{s} = H(\hat{X}) \quad (9)$$

Here, H represents an observation model. For example, a position of the FP $FP_i$ on the imaging plane (u-v plane) is defined as expressed in the following equation.

[Equation 8]

$$\text{position of } FP_i \text{ on imaging plane } \tilde{p}_i = \begin{pmatrix} u_i \\ v_i \\ 1 \end{pmatrix} \quad (10)$$

Here, all of the position of the camera x, the posture of the camera ω and the three-dimensional position $p_i$ of the FP $FP_i$ are given as the elements of the state variable X. Then, the position of the FP $FP_i$ on the imaging plane is derived using the following equation according to a pinhole model.

[Equation 9]

$$\lambda \tilde{p}_i = A R_\omega (p_i - x) \quad (11)$$

Herein, λ represents a parameter for normalization, A represents a camera internal parameter, $R_\omega$ represents the rotation matrix corresponding to the quaternion ω representing the posture of the camera included in the state variable X. The camera internal parameter A is given in advance as expressed in the following equation according to characteristics of the imaging device, which takes the input image.

[Equation 10]

$$A = \begin{pmatrix} -f \cdot k_u & f \cdot k_u \cdot \cot\theta & u_O \\ 0 & -\dfrac{f \cdot k_v}{\sin\theta} & v_O \\ 0 & 0 & 1 \end{pmatrix} \quad (12)$$

Herein, f represents focal distance, θ represents orthogonality of an image axis (ideal value is 90 degrees), $k_u$ represents a scale along a vertical axis of the imaging plane (rate of change of scale from the global coordinate system to the coordinate system of the imaging plane), $k_v$ represents a scale along a horizontal axis of the imaging plane, and ($u_o$, $v_o$) represents a center position of the imaging plane.

Therefore, a feasible latest state variable X may be obtained by searching the state variable X, which makes the error between the predicted observation information derived using Equation (11), that is, the position of each FP on the imaging plane and the result of FP tracking in step S114 in FIG. 5, minimum.

[Equation 11]

$$\text{lastest state variable } X \leftarrow \hat{X} + \text{Innov}(s - \hat{s}) \quad (13)$$

The self-position detecting unit 120 outputs the position x and the posture ω of the camera (imaging device) dynamically updated by applying the SLAM technology in this manner to the environment map building unit 150 and the output image generating unit 180.

(2) Data Storage Unit

Figure 9:
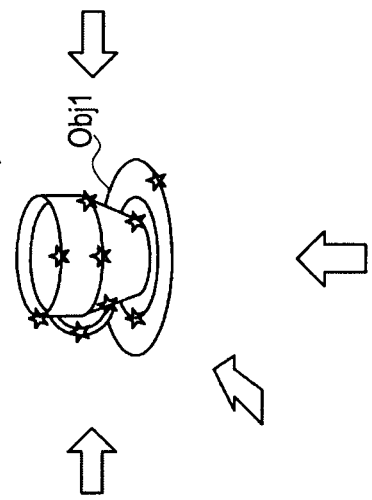
FIG. 9 is an illustrative diagram for illustrating an example of a configuration of feature data.

The data storage unit 130 stores in advance the feature data indicating the feature of the object corresponding to the physical object, which may be present in the real space, using a storage medium such as a hard disk or a semiconductor memory. Although an example in which the data storage unit 130 is a part of the environment map generating unit 110 is shown in FIG. 4, the present invention is not limited to such an example, and the data storage unit 130 may be provided outside the environment map generating unit 110. FIG. 9 is an illustrative diagram for illustrating an example of a configuration of the feature data.

Referring to FIG. 9, feature data FD1 is shown as an example for the object Obj1. The feature data FD1 includes an object name FD11, image data FD12 taken from six directions, patch data FD13, three-dimensional shape data FD14 and ontology data FD15.

The object name FD11 is the name by which a corresponding object may be specified such as a "coffee cup A."

The image data FD12 includes six image data obtained by taking images of the corresponding object from six directions: front, back, left, right, above and below, for example. The patch data FD13 is a set of small images around each FP for each of one or more FPs set on each object. The image data FD12 and the patch data FD13 may be used for an object recognition process in the image recognizing unit 140, which will be described later. Also, the patch data FD13 may be used for the above-described self-position detection process in the self-position detecting unit 120.

The three-dimensional shape data FD14 includes polygon information for recognizing a shape of the corresponding object and three-dimensional positional information of FPs. The three-dimensional shape data FD14 may be used for an environment map building process in the environment map building unit 150, which will be described later.

The ontology data FD15 is the data that may be used to support the environment map building process in the environment map building unit 150, for example. In the example of FIG. 9, the ontology data FD15 indicates that the object Obj1, which is the coffee cup, is more likely to come in contact with an object corresponding to a desk or a dishwasher and is less likely to come in contact with an object corresponding to a bookshelf.

(3) Image Recognizing Unit

The image recognizing unit 140 specifies objects to which physical objects present in the input image correspond, using the above-described feature data stored in the data storage unit 130.

Figure 10:
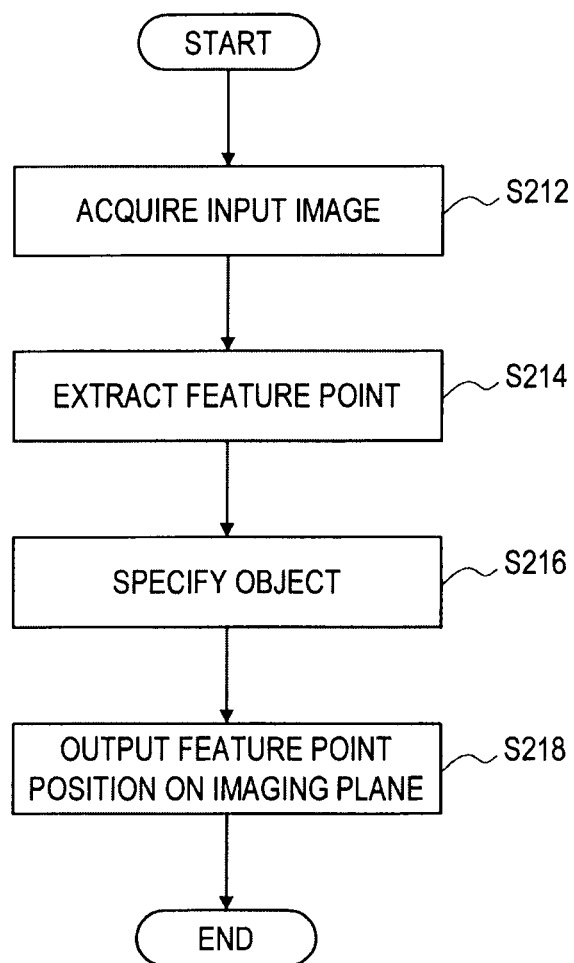
FIG. 10 is a flowchart showing an example of flow of an object recognition process according to an embodiment.

FIG. 10 is a flowchart showing an example of flow of the object recognition process in the image recognizing unit 140. Referring to FIG. 10, first, the image recognizing unit 140 acquires the input image from the imaging unit 102 (step S212). Next, the image recognizing unit 140 matches partial images included in the input image against patches of one or more FPs of each object included in the feature data to extract FPs included in the input image (step S214). The FPs used in the object recognition process in the image recognizing unit 140 and the FPs used in the self-position detection process in the self-position detecting unit 120 are not necessarily the same. However, when common FPs are used in the both processes, the image recognizing unit 140 may reuse the result of FP tracking by the self-position detecting unit 120.

Next, the image recognizing unit 140 specifies the object present in the input image based on the result of extracting the FP (step S216). For example, when the FPs belonging to one object are extracted with high density in a certain area, the image recognizing unit 140 may recognize that the object is present in the area. The image recognizing unit 140 outputs the object name (or an identifier) of the specified object and the position of the FP belonging to the object on the imaging plane to the environment map building unit 150 (step S218).

(4) Environment Map Building Unit

The environment map building unit 150 generates the environment map using the position and the posture of the camera input from the self-position detecting unit 120, the positions of the FPs on the imaging plane input from the image recognizing unit 140 and the feature data stored in the data storage unit 130. In this disclosure, the environment map is a set of data indicating positions (and postures) of one or more objects present in the real space. The environment map may include object names corresponding to objects, the three-dimensional positions of FPs belonging to objects and the polygon information configuring shapes of objects, for example. The environment map may be built by obtaining the three-dimensional position of each FP according to the above-described pinhole model from the position of the FP on the imaging plane input from the image recognizing unit 140, for example.

By changing the relation equation of the pinhole model expressed in Equation (11), the three-dimensional position pi of the FP $FP_i$ in the global coordinate system may be obtained by the following equation.

[Equation 12]

$$p_i = x + \lambda \cdot R_\omega^T \cdot A^{-1} \cdot \tilde{p}_i = x + d \cdot R_\omega^T \frac{A^{-1} \cdot \tilde{p}_i}{\|A^{-1} \cdot \tilde{p}_i\|} \quad (14)$$

Herein, d denotes a distance between the camera and each FP in the global coordinate system. The environment map building unit 150 may calculate such a distance d based on the positions of at least four FPs on the imaging plane and the distance between the FPs for each object. The distance between the FPs is stored in advance in the data storage unit 130 as the three-dimensional shape data FD14 included in the feature data described with reference to FIG. 9. It should be noted that a calculation process of the distance d in Equation (14) is disclosed in detail in Japanese Patent Application Laid-Open Publication No. 2008-304268

After the distance d is calculated, remaining variables of a right side of Equation (14) are the position and the posture of the camera input from the self-position detecting unit 120 and the position of the FP on the imaging plane input from the image recognizing unit 140, all of which are known. The environment map building unit 150 then calculates the three-dimensional position in the global coordinate system for each FP input from the image recognizing unit 140 according to Equation (14). The environment map building unit 150 then builds a latest environment map according to the three-dimensional position of each calculated FP and allows the environment map storage unit 152 to store the built environment map. It should be noted that, at that time, the environment map building unit 150 may improve accuracy of the data of the environment map using the ontology data FD15 included in the feature data described with reference to FIG. 9.

The environment map storage unit 152 stores the environment map built by the environment map building unit 150 using the storage medium such as the hard disk or the semiconductor memory.

[2-3. Output Image Generating Unit]

The output image generating unit 180 generates, for a set of procedures of the operation to be performed in the real space, an output image for presenting the direction for each procedure to the user and displays the generated output image on the display device 104. In this case, the output image generating unit 180 associates a given position in the environment map generated by the environment map generating unit 110 with the direction for each procedure, and superimposes the direction for each procedure at a position in the input image corresponding to the given position. As shown in FIG. 4, in the present embodiment, the output image generating unit 180 includes a procedure storage unit 184, a procedure control unit 186, an information arrangement unit 190, and a superimposing unit 192.

(1) Procedure Storage Unit The procedure storage unit 184 stores procedure data defined by causing the direction for each procedure to correspond to the position information designating a position at which the direction is to be displayed, for a set of procedures of operation to be performed in the real space, using a storage medium such as hard disk or a semiconductor memory.

FIG. 11 is an illustrative diagram for illustrating procedure data 182, for example, stored in the procedure storage unit 184 according to the present embodiment. Referring to FIG. 11, the procedure data 182 has five data items such as "name of directions," "procedure ID," "procedure direction," "related physical object" and "progress condition."

The "name of directions" is a name assigned to each operation to be performed in the real space. Procedure data about a set of procedures for one operation can be acquired by designating one name of directions. In the example of FIG. 11, procedure data of two operations: "table manners" and "frying eggs" is included in the procedure data 182.

The "procedure ID" is an identifier for identifying each procedure included in the set of procedures. In the example of FIG. 11, the procedure data for the "table manners" includes three procedures of procedure IDs: "P101," "P102" and "P103," Also, the procedure data for "frying eggs" includes four procedures of procedure IDs: "P201," "P202," "P203" and "P204."

The "procedure direction" is a character string indicating the direction for each procedure to be present to the user. In the example of FIG. 11, the procedure direction of the procedure of procedure ID="P101" of the "table manners" (hereinafter, referred to as procedure P101) is a character string: "sit from a left side of a chair." The procedure direction of procedure P102 is a character string: "order food and drink." The procedure direction of procedure P103 is a character string: "set a napkin on your lap." Also, the procedure direction of procedure P201 of "frying eggs" is a character string: "divide and stir eggs." The procedure direction of the procedure P202 is a character string: "move the frying pan to the stove." The procedure direction of the procedure P203 is a character string: "put the eggs onto the frying pan." The procedure direction of procedure P204 is a character string: "sprinkle salt and pepper."

The "related physical object" is position information designating a position at which each procedure direction is to be displayed, using an object name for specifying a physical object associated with each procedure direction. For example, in the present embodiment, each procedure direction is displayed in the vicinity of the physical object specified by the "related physical object." In the example of FIG. 11, the related physical object of procedure P101 of the "table manners" is a "chair." That is, the procedure direction of procedure P101 can be displayed in the vicinity of the chair included in the environment map. The related physical object of procedure P102 is a "menu." That is, the procedure direction of the procedure P102 can be displayed in the vicinity of the menu included in the environment map. The related physical object of the procedure P103 is a "napkin." That is, the procedure direction of the procedure P103 can be displayed in the vicinity of the napkin included in the environment map. Further, for example, the "related physical object" for a procedure not associated with any physical object is blank and the procedure direction of this procedure may be displayed in a specific position such as a center of the screen.

The "progress condition" indicates a condition for progressing a displaying process from each procedure to a next procedure when the image processing device 100 displays a set of procedures. That is, the progress condition may be said to be information designating timing when each procedure direction is to be displayed. In the example of FIG. 11, the progress condition is defined according any one or combination of the following three patterns.

First pattern: a state of the physical object in the environment map
Second pattern: passage of a given time
Third pattern: an external event The first pattern is a pattern in which the progress condition is satisfied (i.e., the displaying process proceeds to a next procedure) when the position or posture of the physical object represented by the environment map is in a given state. For example, the progress condition of the procedure P102 of the procedure data 182 is that "a menu is put down." Such a progress condition may be satisfied, for example, when the menu is not present on the table in the environment map. Also, for example, the progress condition of the procedure P103 of the procedure data 182 is that "the napkin is on the chair." Such a progress condition may be satisfied, for example, when in the environment map when the napkin moves from on the table to over the chair (e.g., on the lap of the user seated on the chair).

The second pattern is a pattern in which the progress condition is satisfied when a given time has elapsed from displaying of a preceding procedure direction or generation of another event. For example, the progress condition of the procedure P201 of the procedure data 182 is a "passage of one minute." Such a progress condition may be satisfied when one minute has elapsed after the procedure direction of the procedure P201 is displayed. Also, for example, the progress condition of the procedure P203 of the procedure data 182 is a "passage of 30 seconds from stove ignition." Such a progress condition may be satisfied, for example, when 30 seconds have elapsed from a stove ignition event notified of from an external device (stove).

The third pattern is a pattern in which the progress condition is satisfied when there has been a given event notification from another device. For example, the progress condition of the procedure P202 of the procedure data 182 is that "the frying pan is on the stove." Such a progress condition may be satisfied, for example, when the event is notified of from the stove having detected the frying pan being on the stove, for example, using a pressure sensor. Further, the satisfaction of the condition: "there is a frying pan on a stove" may be determined from a state of the physical object in the environment map (in this case, which is the first pattern). An event notification from another device is not limited to such an example, but may be, for example, a notification of the image recognition result (e.g., the result of recognizing a state of a user's hand) from the imaging device, a notification about a user manipulation from an electronic device, a notification about signal reception from a communication device, or the like.

The procedure storage unit 184 stores such procedure data 182 as an example, and outputs at least part of the procedure data 182 according to a request from the procedure control unit 186, which will be described later. Further, in the example of FIG. 4, the procedure storage unit 184 is provided inside the image processing device 100. However, the prevent invention is not limited to such an example, but the procedure data may be stored in a storage medium external to the image processing device 100. In this case, the image processing device 100 may selectively acquire necessary procedure data from the external storage medium, for example, according to an instruction of the user. Also, a plurality of procedures whose states transition from each other as in a state machine may be defined as procedure data instead of a sequential procedure such as the procedure data 182 illustrated in FIG. 11.

(2) Procedure Control Unit

The procedure control unit 186 acquires procedure data for a desired name of directions from the procedure storage unit 184, for example, according to an instruction from the user, and controls displaying of the procedure direction for each procedure included in the set of procedures according to the acquired procedure data.

Figure 12:
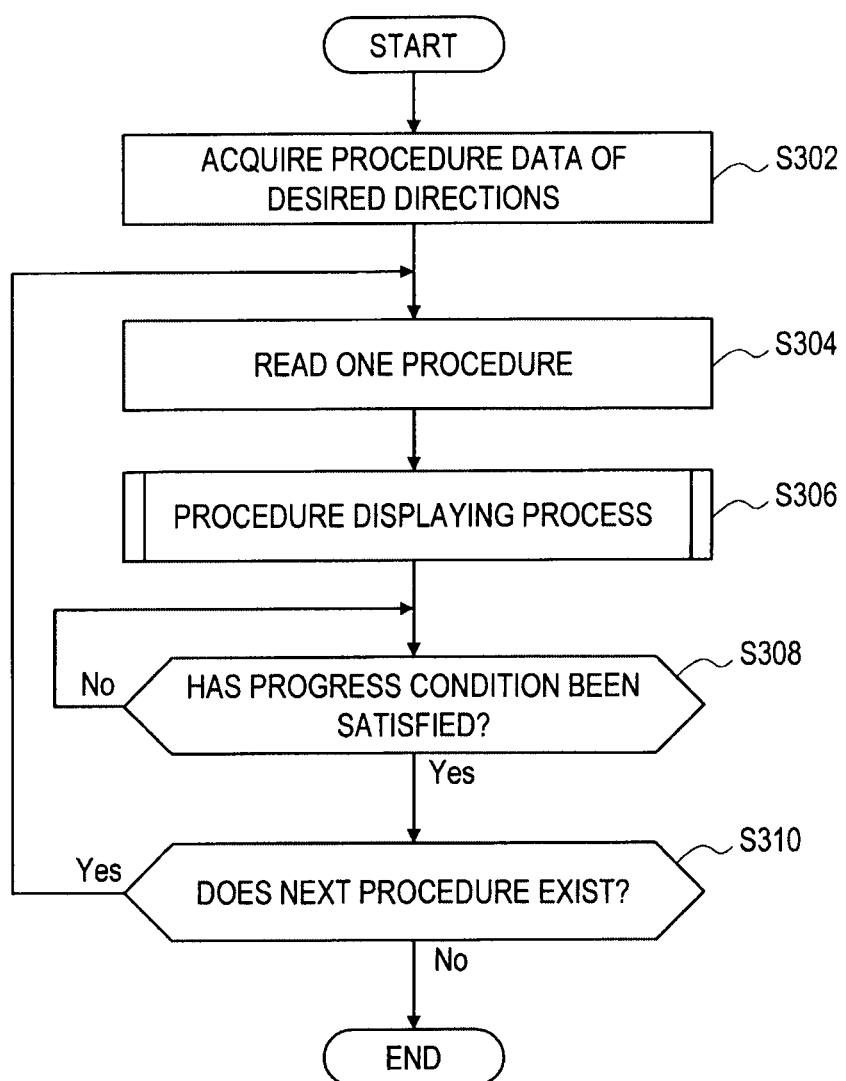
FIG. 12 is a flowchart showing an example of flow of a procedure control process according to an embodiment.

FIG. 12 is a flowchart showing an example of flow of a procedure control process in the procedure control unit 186 according to the present embodiment. Referring to FIG. 12, first, the procedure control unit 186 acquires procedure data for a desired name of directions from the procedure storage unit 184 (step S302). For example, when the user designates "table manners" as the name of directions, the procedure control unit 186 acquires procedure data for the "table manners" including the set of procedures P101, P102, P103, . . . illustrated in FIG. 11.

Next, the procedure control unit 186 reads a first procedure from the acquired procedure data (step S304). For example, when the procedure data including the set of procedures P101, P102, P103 . . . illustrated in FIG. 11 is acquired, the procedure control unit 186 initially reads a record of the procedure P101.

Next, the procedure control unit 186 displays a procedure direction in the vicinity of a related physical object corresponding to the read procedure (step S306). More specifically, the procedure control unit 186 specifies, for example, in the environment map, a position of the related physical object corresponding to the read procedure, and determines the vicinity of the position of the related physical object as a three-dimensional position at which the procedure direction is to be displayed. The procedure control unit 186 outputs the procedure direction and the three-dimensional position at which the procedure direction is to be displayed, to the information arrangement unit 190. A subsequent procedure displaying process will be described in greater detail later.

Next, the procedure control unit 186 monitors a state of the physical object, passage of a given time, an external event, or the like in the environment map according to the progress condition corresponding to the read procedure (step S308). When the progress condition is satisfied as a result of monitoring, the process proceeds to step S310.

Next, the procedure control unit 186 determines whether a next procedure that has not been displayed remains (step S310). Here, when the next procedure that has not been displayed remains, the process returns to step S304 and the procedure displaying process is repeated for a next procedure. On the other hand, when the next procedure that has not been displayed does not remain, the procedure control process in the procedure control unit 186 ends.

(4) Information Arrangement Unit

The information arrangement unit 190 calculates a position in the input image at which each procedure direction input from the procedure control unit 186 is to be displayed, according to Equation 11 of the pinhole model using the position and posture of the imaging device acquired from the environment map generating unit 110. In this case, the three-dimensional position $p_i$ of the FP $FP_i$ at the right side of Equation (11) is substituted with the three-dimensional position input from the procedure control unit 186. After the information arrangement unit 190 calculates the position in the input image at which each procedure direction is to be displayed, the information arrangement unit 190 outputs each procedure direction and the position in the input image at which the procedure direction is to be displayed, to the superimposing unit 192.

(5) Superimposing Unit

The superimposing unit 192 generates an output image by superimposing each procedure direction input from the information arrangement unit 190 at the position in the input image calculated by the information arrangement unit 190.

Figure 13:
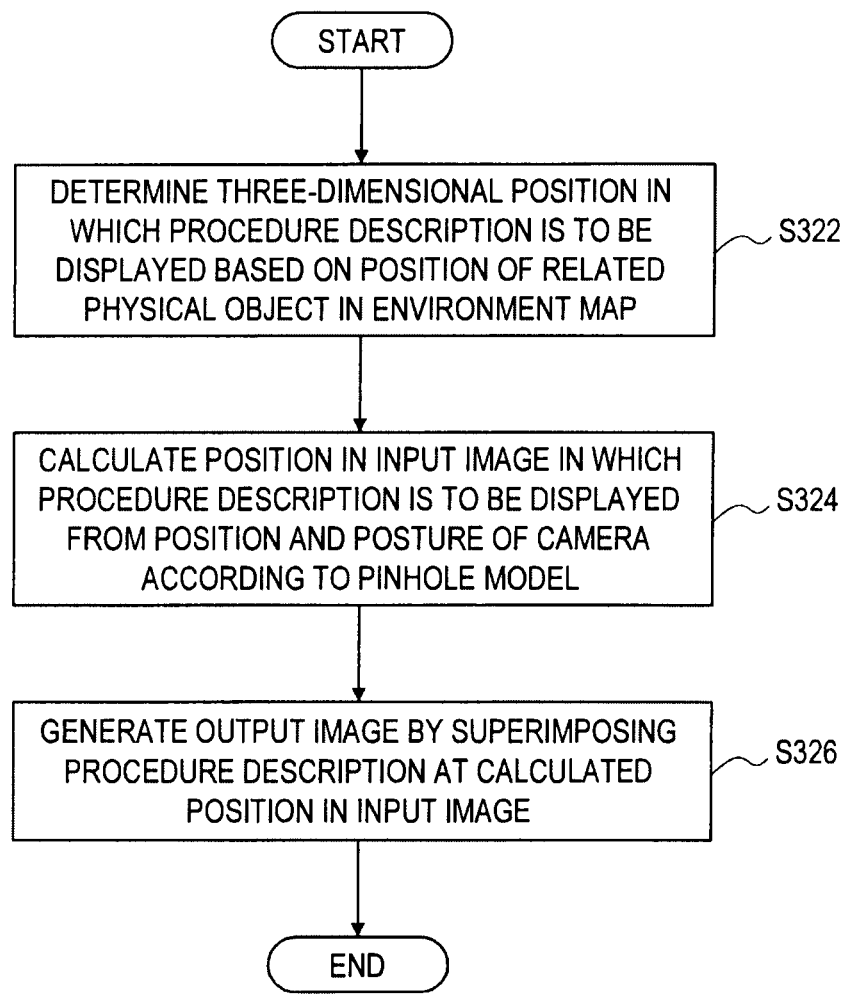
FIG. 13 is a flowchart showing an example of flow of a procedure displaying process according to an embodiment.

FIG. 13 is a flowchart showing an example of flow of a procedure displaying process in the procedure control unit 186, the information arrangement unit 190 and the superimposing unit 192. Further, the procedure displaying process shown in FIG. 13 is executed in step S306 in the procedure control process shown in FIG. 12 for each individual procedure included in a set of procedures of operation to be performed in the real space.

Referring to FIG. 13, first, the procedure control unit 186 determines the three-dimensional position at which the procedure direction is to be displayed, based on a position of a related physical object in the environment map (step S322). For example, when the related physical object for any procedure is on a chair, a position of either a surface or the vicinity of the chair in the environment map is determined as the three-dimensional position at which the procedure direction for the procedure is to be displayed.

Next, the information arrangement unit 190 calculates the position in the input image corresponding to the three-dimensional position determined in step S322 according to the pinhole model using the position and posture of the imaging device acquired from the environment map generating unit 110 (step S324). Further, when the position on the imaging plane corresponding to the three-dimensional position determined in step S322 is out of a range of the input image, a subsequent process may be skipped.

Next, the superimposing unit 192 generates an output image by superimposing, for example, a text box describing the procedure direction at the position in the input image calculated by the information arrangement unit 190 (step S326). The output image generated by the superimposing unit 192 is displayed, for example, on the screen of the display device 104 of the image processing device 100.

[2-4. Example of Output Image]

Figure 14:
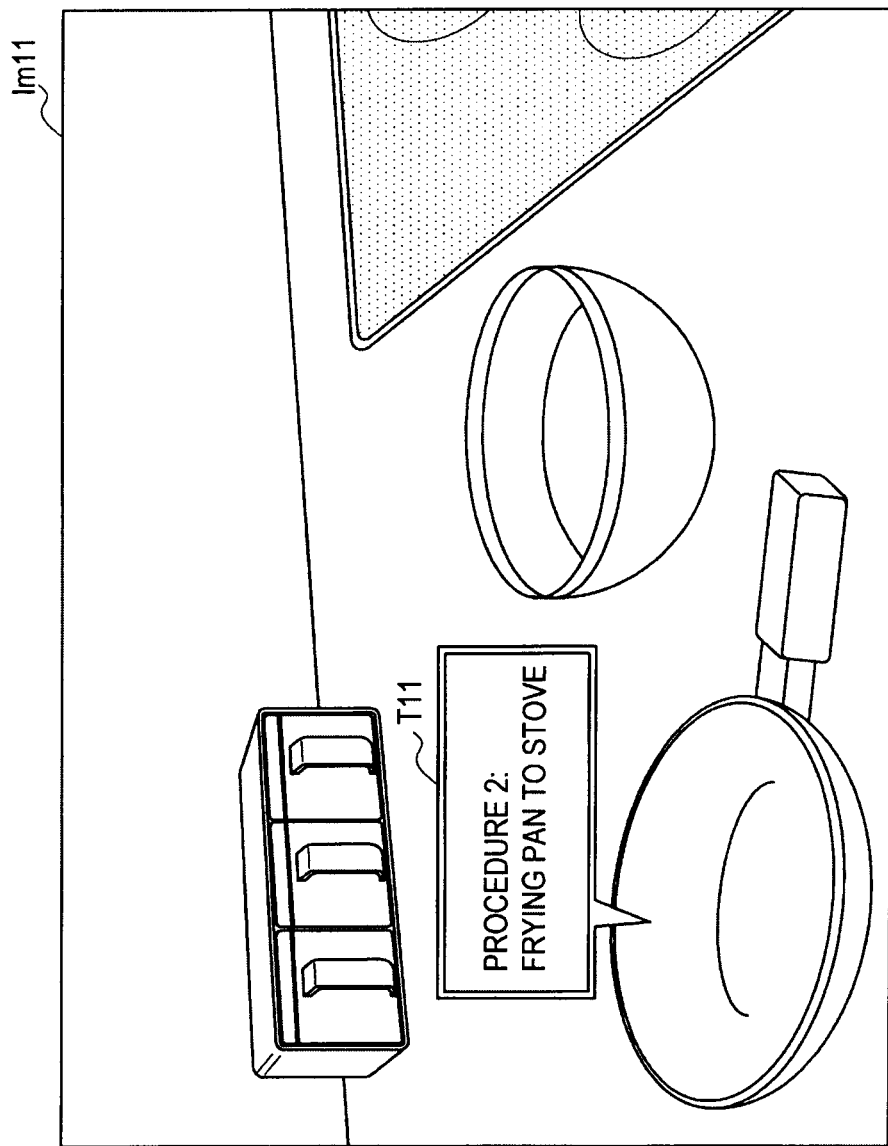
FIG. 14 is an illustrative diagram showing a first example of an output image output by an image processing device according to an embodiment.
Figure 15:
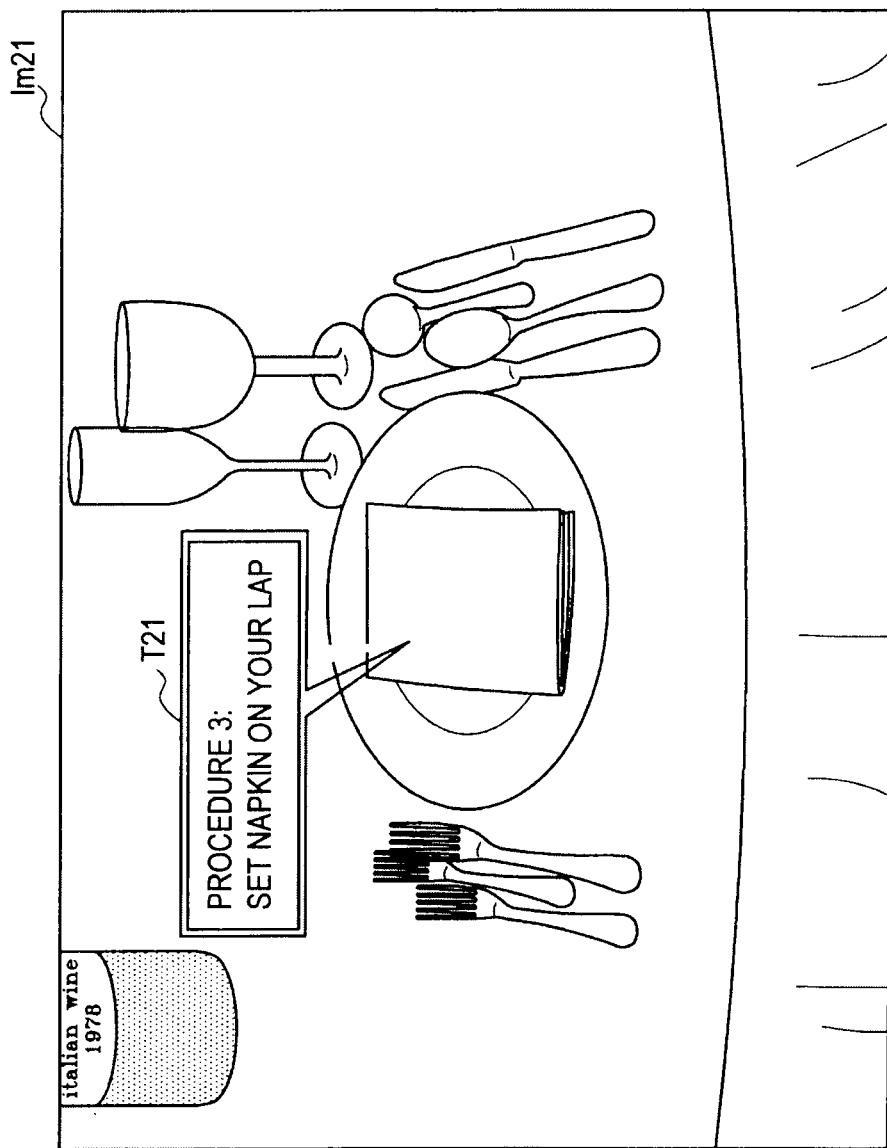
FIG. 15 is an illustrative diagram showing a second example of an output image output by an image processing device according to an embodiment.

FIGS. 14 and 15 show examples of an output image that can be displayed on the screen of the display device 104 in the present embodiment, respectively.

Referring to FIG. 14, an output image Im11 on which the procedure direction for the procedure P202 illustrated in FIG. 11 is superimposed is shown. In the output image Im11, a text box T11 describing a procedure direction "procedure 2: move the frying pan to the stove" is displayed in the vicinity of the frying pan. The user can intuitively recognize that it is good for the frying pan to be on the stove in a next cooking procedure by viewing such a procedure direction. This text box T11 continues to be displayed in the vicinity of the frying pan until a state "the frying pan is on the stove," which is the progress condition of the procedure P202, is realized in the environment map. Thus, the user can easily recognize a physical object serving as an object of the procedure.

Referring to FIG. 15, an output image Im21 on which a procedure direction for the procedure P103 illustrated in FIG. 11 is superimposed is shown. In the output image Im21, a text box T21 describing a procedure direction "procedure3: set a napkin in your lap" is displayed in the vicinity of the napkin. The user can intuitively recognize that it is good for the napkin to be set on the lap in a next procedure of the table manners by viewing such a procedure direction. This text box T21 continues to be displayed in the vicinity of the napkin until a state "the napkin is on the chair." which is the progress condition of the procedure P103, is realized in the environment map. Thus, the user can easily recognize a physical object serving as an object of the procedure.

The procedure display method described herein is only an example, and various applications are possible, in addition to the above-described embodiment. For example, the present invention may be applied for directions in spaces such as commercial facilities or train stations or for manipulation directions in a rent-a-car or an automated teller machine (ATM).

3. Example of Hardware Configuration

It does not matter whether a set of processes according to the above-described embodiment are realized by hardware or software. When a set of processes or a part of the same is executed by the software, a program composing the software is executed using a computer incorporated in dedicated hardware or a general-purpose computer shown in FIG. 16, for example.

In FIG. 16, the CPU 902 controls entire operation of the general-purpose computer. A program or data describing some or all of the processes in the set is stored in a read only memory (ROM) 904. The program and data used by the CPU 902 in process execution are temporarily stored in a random access memory (RAM) 906.

The CPU 902, the ROM 904, and the RAM 906 are connected to each other via a bus 910. Further, an input/output interface 912 is connected to the bus 910.

The input/output interface 912 is an interface for connecting the CPU 902, the ROM 904, and the RAM 906 with the input device 920, the display device 104, the storage device 924, the imaging device 102, and the drive 930.

The input device 920 receives instructions or information input from the user, for example, via an input interface such as a button, a switch, a lever, a mouse, or a keyboard. The storage device 924 includes, for example, a hard disk drive or a semiconductor memory, and stores programs or data. The drive 930 is provided in the general-purpose computer as necessary and, for example, a removable media 932 is mounted in the drive 930.

When the set of processes is executed by software, for example, a program stored in the ROM 904, the storage device 924, or the removable media 932 shown in FIG. 16, when executed, is read into the RAM 906 and then executed by the CPU 902.

4. Conclusion

The embodiment of the present invention has been described with reference to FIGS. 1A to 16. According to the present embodiment, the direction for each procedure included in the set of procedures of the operation to be performed in the real space is displayed at the position determined based on the environment map, which three-dimensionally represents a position of a physical object present in the real space. Accordingly, the procedure can be intuitively understood by the user. In particular, according to the present embodiment, the environment map is dynamically updated to follow a change in the environment even in the operation in the real space in which an environment surrounding the user may be dynamically changed. As a result, the position at which the direction for each procedure is displayed moves according to the change of the environment, thereby preventing difficulty in understanding of the directions from being caused due to the change of the environment.

Also, in the present embodiment, the position at which the direction for each procedure is to be displayed can be determined according to the position of the physical object associated with the direction for each procedure. Accordingly, it is possible for the user to easily recognize the physical object as a target object of the operation in each procedure. Also, since the timing when the direction for each procedure is to be displayed is controlled according to the state (position or posture) of the physical object in the environment map, passage of a given time, an external event or the like, the direction can be displayed at proper timing according to the progress of the operation by the user. Further, the position at which the direction for each procedure is to be displayed is calculated based on the position and posture of the camera dynamically detected using SLAM technology. Accordingly, even when a camera whose position or posture is likely to be changed from moment to moment is used, the direction can be displayed in a proper position in the image.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

What is claimed is:

1. An image processing device comprising:
a processor; and
a non-transitory computer-readable medium encoded with instructions which, when executed by the processor, cause the image processing device to:
acquire procedure data for a set of procedures of operation to be performed in a real space and which associates a procedure of the set of procedures with an object;
control, based on the acquired procedure data, a display of first procedure information by superimposing a first procedure of the set of procedures;
detect a first progress condition when the first procedure information is displayed; and
control, in a case that the first progress condition is detected, a display of second procedure information by superimposing a second procedure of the set of procedures, based on the acquired procedure data,
wherein the first procedure information is related to a first object in the real space, and
wherein the second procedure information is related to a second object in the real space.

2. The image processing device according to claim 1, wherein the first progress condition is detected based on whether or not a predetermined time has elapsed.

3. The image processing device according to claim 1, wherein the first progress condition is detected based on whether or not a predetermined time has elapsed from detecting a user operation.

4. The image processing device according to claim 1, wherein the first procedure information is displayed as a text box.

5. The image processing device according to claim 1, wherein the first progress condition is detected based on a result of recognizing a state of a hand of a user.

6. The image processing device according to claim 1, wherein the non-transitory computer-readable medium is further configured to control a display of the first procedure information at a position associated with the first object in the real space.

7. The image processing device according to claim 1, wherein the procedure data defines a correspondence between a direction for each procedure and position information designating a position at which the direction is to be displayed or a condition for progressing displaying of each direction.

8. The image processing device according to claim 7, wherein the condition for progressing displaying of each direction includes a condition according to a position or a posture of the object.

9. The image processing device according to claim 7, wherein the displaying of the direction for each procedure included in the set of procedures is controlled according to the procedure data.

10. The image processing device according to claim 1, wherein the first progress condition comprises at least one of a state of the object, passage of a given time, an external event, or a combination thereof.

11. The image processing device according to claim 1, wherein the first procedure information is displayed prior to the second procedure information being displayed.

12. The image processing device according to claim 1, wherein the non-transitory computer-readable medium is further configured to store feature data that indicates features of appearance of objects, and
wherein the first object and the second object are identified based on correspondence between the stored feature data.

13. The image processing device according to claim 1, wherein the set of procedures comprises more than two procedures.

14. The image processing device according to claim 13, wherein the image processing device is further caused to:
detect a second progress condition associated with the second procedure when the second procedure information is displayed; and
control, based on the acquired procedure data and when the second progress condition is detected, a display of third procedure image data by superimposing a third procedure of the set of procedures,
wherein the first procedure information is displayed prior to the second procedure information being displayed, and the second procedure information is displayed prior to the third procedure image data being displayed, and
wherein the third procedure image data is related to a third object in the real space.

15. The image processing device according to claim 1, wherein the set of procedures comprises text based information.

16. An image processing method comprising:
acquiring procedure data for a set of procedures of operation to be performed in a real space and which associates a procedure of the set of procedures with an object;
controlling, based on the acquired procedure data, a display of first procedure information by superimposing a first procedure of the set of procedures;
detecting a first progress condition when the first procedure information is displayed; and
controlling, in a case that the first progress condition is detected, a display of second procedure information by superimposing a second procedure of the set of procedures, based on the acquired procedure data,
wherein the first procedure information is related to a first object in the real space, and
wherein the second procedure information is related to a second object in the real space.

17. A non-transitory computer-readable medium having embodied thereon a program, which when executed by a computer causes the computer to execute a method, the method comprising:
acquiring procedure data for a set of procedures of operation to be performed in a real space and which associates a procedure of the set of procedures with an object;
controlling, based on the acquired procedure data, a display of first procedure information by superimposing a first procedure of the set of procedures;
detecting a first progress condition when the first procedure information is displayed; and
controlling, in a case that the first progress condition is detected, a display of second procedure information by superimposing a second procedure of the set of procedures, based on the acquired procedure data,
wherein the first procedure information is related to a first object in the real space, and
wherein the second procedure information is related to a second object in the real space.

* * * * *